United States Patent
Lewis et al.

(10) Patent No.: US 6,579,404 B2
(45) Date of Patent: Jun. 17, 2003

(54) METHOD OF MAKING PRECISION GEOMETRY ADVANCED COMPOSITE HONEYCOMB MATERIAL FOR SPACECRAFT APPLICATIONS AND HONEYCOMB MATERIAL MADE THEREBY

(75) Inventors: Richard A. Lewis, El Segundo, CA (US); Richard C. Yocky, Lakewood, CA (US); Michael Rivera, Los Angeles, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 195 days.

(21) Appl. No.: 09/769,171

(22) Filed: Jan. 23, 2001

(65) Prior Publication Data
US 2002/0098321 A1 Jul. 25, 2002

(51) Int. Cl.[7] .............................................. B32B 31/00
(52) U.S. Cl. ....................... 156/292; 264/286; 264/337; 264/338; 249/134
(58) Field of Search ................................ 264/286, 337, 264/338; 249/134; 156/292

(56) References Cited

U.S. PATENT DOCUMENTS

| 3,888,618 | A | * | 6/1975 | Jones ........................... 264/286 |
| 4,052,523 | A | | 10/1977 | Rhodes et al. |
| 5,443,884 | A | | 8/1995 | Lusignea et al. |
| 5,863,452 | A | | 1/1999 | Harshberger, Jr. et al. |
| 5,981,025 | A | | 11/1999 | Marshall et al. |

* cited by examiner

Primary Examiner—James Derrington

(57) ABSTRACT

A method of making precision geometry honeycomb material formed of a composite material and exhibiting dimensional uniformity, is disclosed. Composite material is molded in the cavity of a single-sided female mold to form a first web with a plurality of honeycomb cell portions of the desired cell shape in the web. The details of the cavity mold configuration are captured to form the honeycomb cell portions in the composite material during molding the web by applying pressure to the composite material in the mold with an elastomeric pressure intensifier. The composite material of the web is stabilized as by curing. First and second molded webs are precisely aligned in a fixture and joined together at facing cell nodes thereof by bonding yielding a honeycomb material with superior geometric platform.

11 Claims, 3 Drawing Sheets

METHOD OF MAKING PRECISION GEOMETRY ADVANCED COMPOSITE HONEYCOMB MATERIAL FOR SPACECRAFT APPLICATIONS AND HONEYCOMB MATERIAL MADE THEREBY

TECHNICAL FIELD

The disclosed invention relates to honeycomb material having honeycomb cells of desired shape and being formed of a composite material, and to a method of making the honeycomb material. The honeycomb material is useful for spacecraft applications such as for wave guide arrays or structural members, as well as for submersibles and ground based antennas.

BACKGROUND

Typically, spacecraft utilize metallic honeycomb materials within structural elements. Of late, advanced composite materials other than metallic materials have begun to emerge. Since metallic honeycomb materials are typically made using a welding and/or expansion process, novel approaches are required to achieve similar structural materials using composite materials. A composite process gaining favor molds the honeycomb cells around forming rods and pins. See U.S. Pat. Nos. 5,981,025 and 5,443,884, for example. This known process is very labor intensive, and has severe limitations in the cell sizes and billet thicknesses achievable due to inherent limitations of manufacturing small thin long rods and pins. The practical limit in cell size is $3/16$ inch and the billet depth is 10–12 inches. There is an alternate process which molds an individual corrugated cell web, which is then secondarily bonded to an adjacent web to form the complete honeycomb cell structure. These constructions are typically of poor geometry, meaning that the webs are bonded to one another without internal support to the cells and as a result exhibit dimensional non-uniformity. This drastically affects the performance of the honeycomb core assembly when used structurally and even more so when used in wave guide array applications.

SUMMARY OF THE INVENTION

The method of the invention and the honeycomb material made thereby overcome the aforementioned limitations and drawbacks of the known methods and honeycomb materials. This is accomplished by the method of the invention of making a precision geometry honeycomb material having honeycomb cells of a desired cell shape and being formed of a composite material, wherein the method comprises molding a composite material in the cavity of a single-sided female mold which is configured to form a first web with a plurality of honeycomb cell portions of the desired cell shape in the web without necessitating the use of forming rods and pins as in the aforementioned known process. According to the invention, during molding the details of the cavity mold configuration of the single-sided female mold are captured to form the plurality of honeycomb cell portions in the composite material web by applying pressure to the composite material in the mold with an elastomeric pressure intensifier.

The elastomeric pressure intensifier, which can be reinforced with Graphite/Epoxy prepreg material, as required for rigidity and dimensional stability, applies pressure to the composite material in the mold is preferably configured to complement the cavity configuration of the single-sided female mold. For this purpose, according to the method the elastomeric pressure intensifier is formed by molding an elastomeric material in the single-sided female mold. In a disclosed embodiment, the pressure intensifier is a fluoroethylene polymer/polytetrafluoroethylene faced elastomeric B-staged, calendered butyl rubber/silicone material.

Further, according to the method the molded first web is joined to a second web having a plurality of honeycomb cell portions which cooperate with the honeycomb cell portions in the first web to form a honeycomb material having honeycomb cells therein of the desired cell shape. In the disclosed embodiment, each of the webs has honeycomb cell portions which are half-cell portions. The joining includes accurately aligning the first and second webs with respect to each other in a fixture and adhesively bonding the facing webs to one another at opposing cell nodes located between the honeycomb cell portions of each web. The bonding fixture is configured to support the honeycomb cell portions of each of the webs for aligning and bonding the webs to one another. The improved method of the invention advantageously removes limitations of cell size and billet height (thickness). Cell sizes smaller than 0.100 inch are achievable in thicknesses greater than 24 inches. The shape of the cells in the disclosed embodiment is hexagonal but other shapes can be employed.

The honeycomb material produced by the method has a cell geometry with highly controlled dimensions, wherein the cell nodes of the webs are precisely aligned with respect to each and joined together to form the bonded connection such that the honeycomb material exhibits dimensional uniformity. Manufacturing costs are also lower with the invention as compared with rod/pin molding techniques. These attributes make the honeycomb material of the invention particularly useful in wave guide arrays and where structural designs call for honeycomb materials such as cores of complex geometry that are fashioned using computer numerical controlled machining of desired compound shapes.

These and other features and advantages of the present invention will become more apparent from the following detailed description of an embodiment of the invention taken with the accompanying drawings.

DETAILED DESCRIPTION OF DISCLOSED EMBODIMENT

Figure 1:
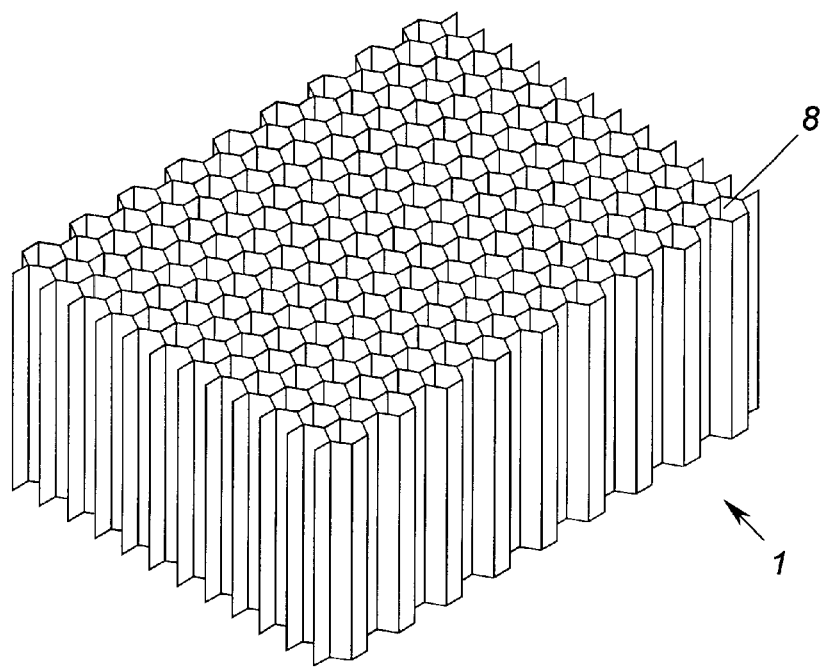
FIG. 1 is a view from above and to the front of a $1/8$ inch cell graphite honeycomb block of the invention made by the method of the invention.
Figure 7:
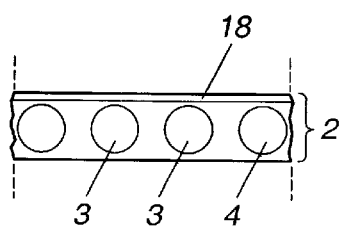
FIG. 7 is an enlarged view of a portion of a web shown in FIG. 6 within the circle D schematically depicting graphite fibers and the resin matrix of the composite material of the molded web with an adhesive applied on the upper surface of cell node of the web for bonding to the opposing web in the bonding fixture of FIG. 6.

Referring now to the drawings, a ⅛ inch hexagonal cell honeycomb block or core 1 according to the invention is depicted in FIG. 1. The honeycomb core 1 is formed of a composite material 2 shown in FIG. 7. The composite material in the illustrated embodiment comprises unidirectionally oriented graphite fibers 3 in a resin matrix of a thermoset/thermoplastic material, polycyanate resin, for example. Other fibers and matrix resins may be used as understood by the skilled artisan.

Figure 4:
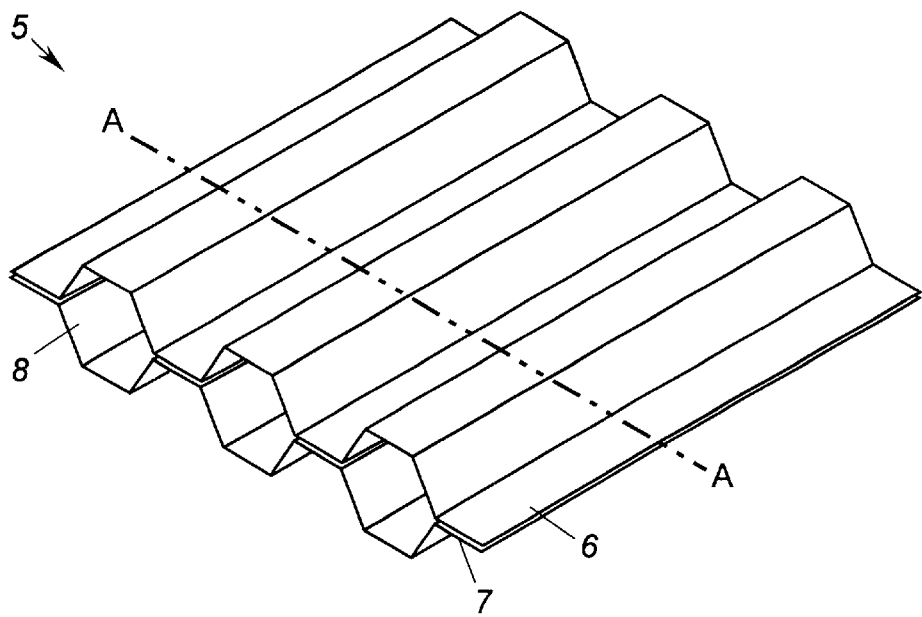
FIG. 4 is an enlarged perspective view of two cured webs positioned to form hexagonal honeycomb cells of a portion of a single layer hexagonal sheet of honeycomb material of the invention formed by bonding the two molded webs of composite material together according to the method of the invention.

A single layer of hexagonal cell shape honeycomb material 5 of the invention, which may be used to form the core 1, is shown in FIG. 4. The honeycomb material 5 is formed by bonding together two molded webs 6 and 7 of composite material made according to the invention. Individual strips of a desired width can be sliced from the hexagonal cellular honeycomb material 5 in a direction A—A at right angles to the longitudinal axis of the hexagonal cells therein as depicted in FIG. 4. The outward-facing outer surfaces of the individual strips can then be stacked up and bonded to one another to form the honeycomb core 1 in FIG. 1, as will be understood by the skilled artisan. A built-up structure with sandwich facings, not shown, applied to each side of the honeycomb core to form a panel may also be constructed.

Figure 2:
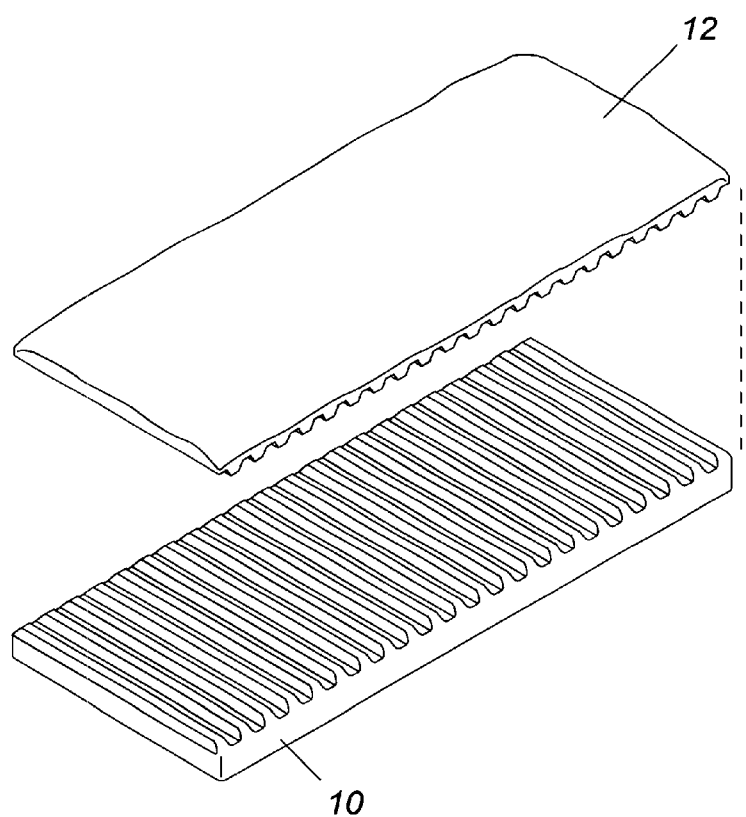
FIG. 2 is a view from the front and above of tooling of the invention for practicing the method of the invention to make the composite material honeycomb of FIG. 1.
Figure 5:
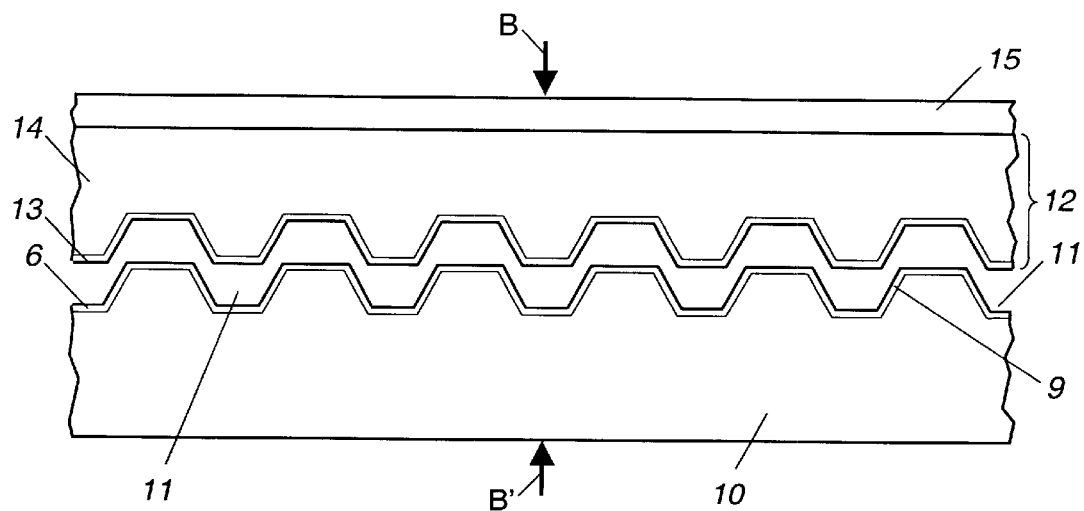
FIG. 5 is a sectional view of the single-sided female mold and elastomeric pressure intensifier shown in FIG. 2 used for molding a composite material to form a web with a plurality of honeycomb cell portions, particularly half-cell portions of hexagonal honeycomb cells, for making honeycomb material of FIG. 4 in accordance with the invention.

The honeycomb material 5 of the invention is a precision geometry honeycomb material which is made by molding a thin sheet of the composite material 2 in the cavity 9 of a single-sided female mold 10, FIGS. 2 and 5, which is configured to form the first web 6 with a plurality of honeycomb cell portions 11 of the desired cell shape in the honeycomb material. The cell portions 11 are half-cell portions of hexagonal cells 8 in the disclosed embodiment, but other shapes such as square, oval and diamond shape could be employed. A thin sheet of composite material 2, for example 0.003 inch thick, is corrugated in the mold 10 during molding. The details of the cavity mold configuration to form the plurality of honeycomb cell portions 11 in the composite material are captured by applying pressure to the composite material in the mold with an elastomeric pressure intensifier 12 shown in FIGS. 2 and 5 under the application of a compression molding pressure to the mold 10 and intensifier 12 in the direction of arrows B and B'. The external molding pressure in the example is preferably 50 to 100 psi.

The intensifier 12 has a surface applying pressure to the composite material 2 in the mold 10 which is configured to be complementary to the cavity configuration of the single-sided female mold 10. The intensifier 12 in the illustrated embodiment comprises a polytetrafluorethylene/fluoroethylene polymer facing 13 on an elastomeric B-staged calendared butyl rubber/silicone material 14.

A preferred way of attaching the facing 13 to the rubber caul/pressure intensifier 14 involves using a bondable one-side-only film of Teflon. For example, DuPont's FEP/PTFE, skived film sheet marketed by Airtech International as A4000 B.O.S.O. having a thickness of 0.003–0.005 inch can be used. The film is supplied plasma/chemically etched on one side. This etched side is bondable to the B staged, uncured rubber material of the conformal pressure intensifier 14. The Teflon film, bondable side towards the rubber, is de-bulked to the uncured elastomeric product using hand pressure or vacuum pressure.

This stack (sandwich) is then further nested into the honeycomb composite's cavity mold 10 to be processed under heat/pressure into the pressure intensifier 12, typically in an autoclave where a minimum of 50 PSIG is applied along with the required heat. The resultant "Boot" 15 is now faced with the unetched (slick) Teflon 13 on exterior surfaces, and this film is well bonded to the rubber and provides multiple use cycles.

Alternatively, the intensifier 12 is formed by molding the elastomeric rubber/silicone material in the single-sided female mold 10 and then coating the surface of the molded material with facing 13. The facing 13 has a thickness of 0.005 inch in the disclosed embodiment, and the thickness of the rubber/silicone material 14 is 0.1000.250 inch thick. The composite material 2 is molded under the application of heat and pressure, applied in the direction of the arrows B, B' in FIG. 5, applied to a metal backing 15 of the elastomeric pressure intensifier 12 and the mold 10. The molded web is cured to achieve a stable web structure before joining the first and second webs 6 and 7.

Figure 6:
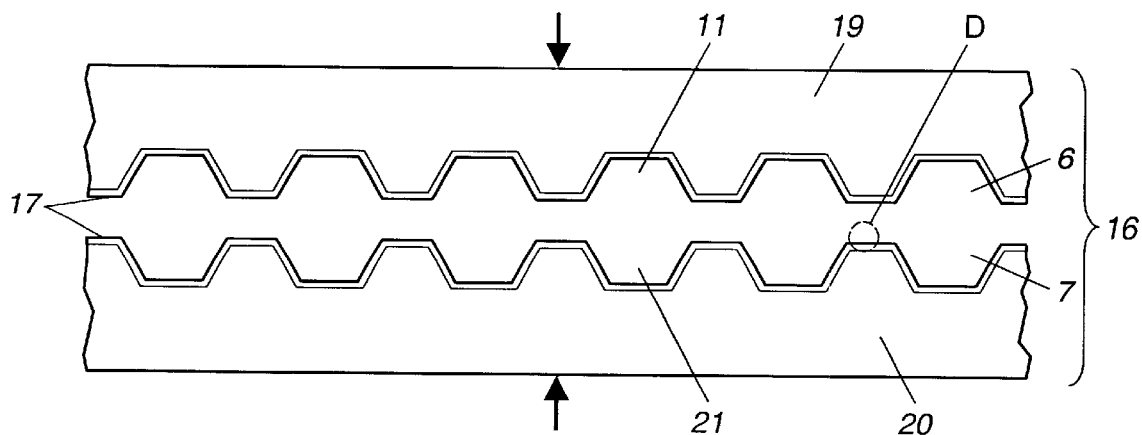
FIG. 6 is a sectional view of a bonding fixture taken at a right angle to the longitudinal direction of the honeycomb cell portions of two webs of the invention for accurately aligning and bonding the two opposing webs at cell nodes thereof, the two webs to be bonded being shown in spaced opposed position for bonding.

The molded first web 6 is joined to a second web 7 of similar construction made according to the invention and having a plurality of honeycomb cell portions 21 which cooperate with the honeycomb cell portions 11 in the first web 6 to form the honeycomb material 5 having honeycomb cells 8 therein of the desired cell shape, hexagonal in the illustrate embodiment. For this purpose, the first and second webs 6 and 7 are accurately aligned with respect to each other in a bonding fixture 16 illustrated schematically in FIGS. 3 and 6. The webs are adhesively bonded to one another at opposing cell nodes 17 located between the honeycomb cell portions thereof by an adhesive 18 applied thereto to form the honeycomb material 5 with honeycomb cells 8 of hexagonal shape. The bonding fixture includes upper and lower fixture members 19 and 20 which are each configured on their opposed faces to support the honeycomb cell portions 11, 21 of the webs 6 and 7 for aligning and bonding the webs to one another without necessitating the use of rods/pins as in the prior art.

The cavity mold 10 for forming the half-cell continuous webs 6 and 7 is made using a base material which is coefficient of thermal expansion and temperature matched for the composite material being molded. An aluminum alloy mold can be used for fiber glass composites and low modulus graphite materials in a thermoset/thermoplastic resin matrix, for example. The mold 10 can be made of fused silica for high temperature metal matrix materials. Steel molds are useful for room temperature cure matrix systems.

Figure 3:
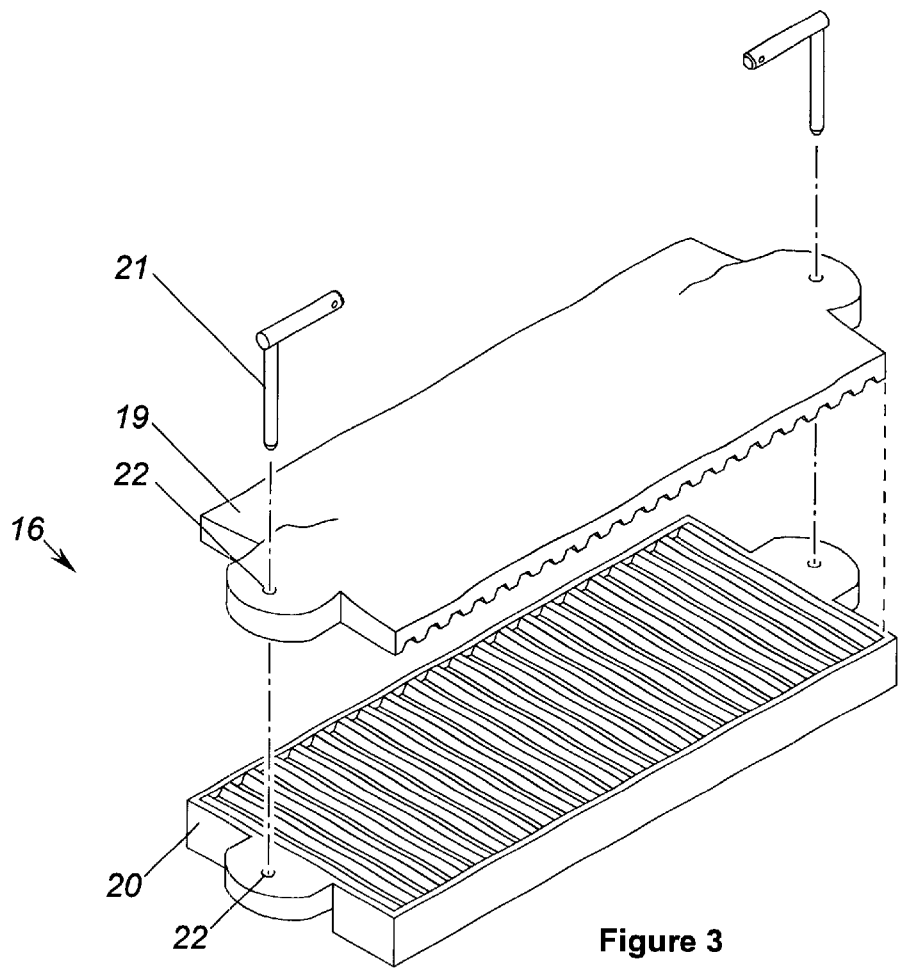
FIG. 3 is a view from the front and above of a honeycomb web bond fixture for aligning pre-cured webs during secondary bonding steps in the method of the invention.

The upper fixture member 19 or top caul plate of the bonding fixture 16 and the lower fixture member 20 or caul bottom base are fashioned with alignment pins 21 which cooperate with holes 22 in the members 19 and 20, FIG. 3, to perfectly index the web material and this alignment causes the cell nodes 17 of the facing webs to align perfectly, yielding a honeycomb with superior geometric planform. The cell nodes 17 are precisely mated and the center of each cell is precisely located in the location now dictated by the bond fixture 16. Adhesive 18, which is appropriate for the desired application, is then applied to the cell nodes on the facing webs to accomplish the interactive structural bond of the honeycomb billet 5. When molded in this fashion, each cell wall is entirely supported during this bonding of the web set, which is not as labor-intensive as manually placing and extracting pins/rods.

The method of making a precision geometry honeycomb material according to the invention advantageously removes limitations of cell size and billet height (thickness). Cell sizes smaller than 0.100 inch are achievable in thicknesses greater than 24 inches. These attributes are of use in wave guide arrays and/or structural members whose designs call for honeycomb materials of complex geometry that are fashioned using computer numerical controlled (CNC) machining of desired compound shapes. Additionally, the method of the invention produces cell geometry with highly controlled dimensions. Honeycomb materials having common cell sizes and billet thicknesses can be manufactured with the invention at a lower labor cost compared to rod/pin molding techniques. The honeycomb material of the invention has utility not only for spacecraft structural applications and spacecraft wave guide arrays, but also for submersibles and ground-based antennas.

This concludes the description of the example embodiment. Although the present invention has been described with reference to a disclosed embodiment, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement and method within the scope of the foregoing disclosure, the drawings, and the appended claims without departing from the spirit of the invention. In addition to variations and modifications in the component parts and/or arrangements and method, alternative uses will also be apparent to those skilled in the art.

What is claimed:

1. A method of making a precision geometry honeycomb material having honeycomb cells of a desired cell shape therein and being formed of a composite material, said method comprising:

molding a composite material in the cavity of a single-sided female mold which is configured to form a first web with a plurality of honeycomb cell portions of the desired cell shape in said web, said molding including capturing the details of the cavity mold configuration to form said plurality of honeycomb cell portions in said composite material web by applying pressure to said composite material in said mold with an elastomeric pressure intensifier, and curing the composite material of said first web to achieve a stable web structure and then joining said molded first web to a second web having a plurality of honeycomb cell portions which cooperate with said honeycomb cell portions in said first web to form a honeycomb material having honeycomb cells therein of said desired cell shape.

2. A method of making a precision geometry honeycomb material having honeycomb cells of a desired cell shape therein and being formed of a composite material, said method comprising:

molding a composite material in the cavity of a single-sided female mold which is configured to form a first web with a plurality of half-cell honeycomb cell portions of the desired cell shape in said web, said molding including capturing the details of the cavity mold configuration to form said plurality of honeycomb cell portions in said composite material web by applying pressure to said composite material in said mold with an elastomeric pressure intensifier, and curing the composite material of said first web to achieve a stable web structure and then joining said molded first web to a second web having a plurality of honeycomb cell portions which cooperate with said honeycomb cell portions in said first web to form a honeycomb material having honeycomb cells therein of said desired cell shape.

3. A method of making a precision geometry honeycomb material having honeycomb cells of a desired cell shape therein and being formed of a composite material, said method comprising:

molding a composite material in the cavity of a single-sided female mold which is configured to form a first web with a plurality of honeycomb cell portions of the desired cell shape in said web, said molding including capturing the details of the cavity mold configuration to form said plurality of honeycomb cell portions in said composite material web by applying pressure to said composite material in said mold with an elastomeric pressure intensifier, said elastomeric pressure intensifier having a surface applying said pressure to said composite material which is configured to be complementary to the cavity configguration of said single-sided female mold, and curing the composite material of said first web to achieve a stable web structure and then joining said molded first web to a second web having a plurality of honeycomb cell portions which cooperate with said honeycomb cell portions in said first web to form a honeycomb material having honeycomb cells therein of said desired cell shape.

4. The method according to claim 3, including forming said elastomeric pressure intensifier for applying pressure to said composite material by molding an elastomeric material in said single-sided female mold.

5. A method of making a precision geometry honeycomb material having honeycomb cells of a desired cell shape therein and being formed of a composite material, said method comprising:

molding a composite material in the cavity of a single-sided female mold which is configured to form a first web with a plurality of honeycomb cell portions of the desired cell shape in said web, said molding including capturing the details of the cavity mold configuration to form said plurality of honeycomb cell portions in said composite material web by applying pressure to said composite material in said mold with an elastomeric pressure intensifier, said elastomeric pressure intensifier comprising a polytetrafluoroethylene faced elastomeric B-staged, calendered butyl rubber/silicone material, and joining said molded first web to a second web having a plurality of honeycomb cell portions which cooperate with said honeycomb cell portions in said first web to form a honeycomb material having honeycomb cells therein of said desired cell shape.

6. A method of making a precision geometry honeycomb material having honeycomb cells of a desired cell shape therein and being formed of a composite material, comprising a fiber reinforced thermoset/thermoplastic matrix material, said method comprising:

molding a composite material in the cavity of a single-sided female mold which is configured to form a first web with a plurality of honeycomb cell portions of the desired cell shape in said web, said molding including capturing the details of the cavity mold configuration to form said plurality of honeycomb cell portions in said composite material web by applying pressure to said composite material in said mold with an elastomeric pressure intensifier, and curing the composite material of said first web to achieve a stable web structure and then joining said molded first web to a second web having a plurality of honeycomb cell portions which cooperate with said honeycomb cell portions in said first web to form a honeycomb material having honeycomb cells therein of said desired cell shape.

7. The method according to claim 1, wherein the shape of said honeycomb cells as seen in a cross-section perpendicular to a longitudinal axis of said cells is selected from the group consisting of hexagonal, square, oval and diamond shaped.

8. A method of making a precision geometry honeycomb material having honeycomb cells of a desired cell shape therein and being formed of a composite material, said method comprising:

molding a composite material in the cavity of a single-sided female mold which is configured to form a first web with a plurality of honeycomb cell portions of the desired cell shape in said web, said single-sided female mold being formed of a material which is coefficient of thermal expansion and temperature matched with the composite material of said web being molded therein, said molding including capturing the details of the cavity mold configuration to form said plurality of honeycomb cell portions in said composite material web by applying pressure to said composite material in said mold with an elastomeric pressure intensifier, and curing the composite material of said first web to achieve a stable web structure and then joining said molded first web to a second web having a plurality of honeycomb cell portions which cooperate with said honeycomb cell portions in said first web to form a honeycomb material having honeycomb cells therein of said desired cell shape.

9. The method according to claim 8, wherein said mold material is selected from the group consisting of an aluminum alloy, fused silica and steel.

10. A method of making a precision geometry honeycomb material having honeycomb cells of a desired cell shape therein and being formed of a composite material, said method comprising:

molding a composite material in the cavity of a single-sided female mold which is configured to form a first web with a plurality of honeycomb cell portions of the desired cell shape in said web, said molding including capturing the details of the cavity mold configuration to form said plurality of honeycomb cell portions in said composite material web by applying pressure to said composite material in said mold with an elastomeric pressure intensifier, and joining said molded first web to a second web having a plurality of honeycomb cell portions which cooperate with said honeycomb cell portions in said first web to form a honeycomb material having honeycomb cells therein of said desired cell shape, said joining including accurately aligning said first and second webs with respect to each other in a bonding fixture and adhesively bonding said webs to one another at cell nodes located between said honeycomb cell portions thereof to form said honeycomb material with honeycomb cells of said desired shape.

11. The method according to claim 10, wherein said bonding fixture is configured to support said honeycomb cell portions of each of said first and second webs for said aligning and bonding of said webs to one another.

* * * * *